United States Patent [19]

Hart et al.

[11] Patent Number: 4,857,944
[45] Date of Patent: Aug. 15, 1989

[54] RECALIBRATION SYSTEM FOR LED ARRAY

[75] Inventors: Peter B. Hart, Northampton; George A. A. Chilton, Buckinghamshire; Richard A. Kirk, Northampton, all of England

[73] Assignee: Plessey Overseas Limited, Ilford, England

[21] Appl. No.: 251,497

[22] Filed: Sep. 30, 1988

[30] Foreign Application Priority Data

Sep. 30, 1987 [GB] United Kingdom ............. 8722944

[51] Int. Cl.⁴ .................................... G01D 15/00
[52] U.S. Cl. .............................. 346/154; 346/160
[58] Field of Search ............... 346/1.1, 155, 139 C, 346/107 R, 108, 160, 154; 358/300, 302; 250/553; 355/8; 364/518, 519

[56] References Cited

U.S. PATENT DOCUMENTS 4,651,176 3/1987 Yamakawa et al. ............. 346/160
4,700,206 10/1987 Yamakawa et al. ............. 346/160

Primary Examiner—Arthur G. Evans
Attorney, Agent, or Firm—Fleit, Jacobson, Cohn, Price, Holman & Stern

[57] ABSTRACT

A simple and reliable method of recalibrating a LED print head comprises providing a photodetector array for detecting the intensity of illumination of each LED, comparing the actual intensity with a desired value and adjusting the level of current applied to the LED array until the actual and desired values correspond, at which time a memory storing the current levels to be applied to the diode array is updated. One or more reference diodes are provided and employed in an initial step in which the current applied to the reference diodes is adjusted until actual and desired current levels correspond, at which time all stored current values for all LED are updated.

8 Claims, 3 Drawing Sheets

RECALIBRATION SYSTEM FOR LED ARRAY

BACKGROUND OF THE INVENTION

This invention relates to a recalibration system for a light emitting diode (LED) array for use in a print head of a line printer.

A print head of a line printer may comprise an array of LED arranged in a line which may be as long as one meter, the line being composed of a tightly packed LED array with each LED providing one pixel of the image to be produced with 600 pixel per inch. It is a known problem that a tight tolerance in uniformity of light output in such a high quality print head is difficult to achieve and even more difficult to maintain. As diodes degrade at different rates, an internal recalibration system is essential to a printer with an expected life >10,000 hours. Calibration systems are known, see for example U.S. Pat. No. 4,596,995 which require a usual inspection of intensity levels by a human operator; such systems would not be suitable for a recalibration system which can be operated automatically on a daily basis.

SUMMARY OF THE INVENTION

In one aspect the invention provides a method of automatic recalibration of a print head comprising an array of light emitting diodes (LED) each providing one pixel of an image to be printed, the method comprising:

(a) providing one or more photodetectors for detecting the intensity of illumination of the diodes;

(b) storing in memory data relating to individual current levels to be applied to the respective diodes for illumination thereof, and storing in memory data relating to individual intensities of illumination;

(c) for each diode applying the respective current level and detecting the actual intensity of illumination with said one or more photodetectors, determining whether its actual intensity corresponds to the respective stored value of intensity of illumination, and if not adjusting the current level applied to the diode until the actual intensity corresponds with the respective stored value of intensity; and (d) replacing the data stored in memory with data relating to the adjusted current level.

In another aspect the invention provides apparatus for use in the aforesaid method, the apparatus comprising an array of light emitting diodes (LED) each providing one pixel of an image to be printed, one or more photodetectors for detected the intensity of illumination of the diodes, a memory storing data relating to current levels to be applied to the diodes for illumination thereof, and means for storing data relating to individual intensities of illumination of the diodes, means for determining whether an actual intensity of illumination detected by said photodetectors corresponds with a stored value of intensity of illumination, means for adjusting the current levels to be applied to the diodes, and means for replacing the data stored in memory with data relating to adjusted current levels.

As preferred, one or more reference diodes are provided, which are normally held in a switched off condition and data is stored in said memory relating to desired currents levels to be applied to the one or more reference diodes to achieve desired intensities of illumination and prior to the step (c) of current level adjustment, the desired current level is applied to a reference light emitting diode and it is determined by means of said photodetectors whether the actual intensity of illumination corresponds to the desired intensity of illumination, and if not the current level applied to the reference diode is adjusted until the actual intensity corresponds to the desired intensity, the data stored in memory is replaced with data relating to the adjusted current level to be applied to the reference diode, and the data stored in memory relating to the desired current level to be applied to the LED of the print array is replaced with similarly adjusted current levels.

A preferred embodiment of the invention will now be described with reference to the accompanying drawings, wherein:

BRIEF DESCRIPTION OF THE DRAWINGS

Referring now to FIG. 1 of the drawings there is shown a print head 2 for a line printer comprising an aluminium heat sink 4 on which is mounted a central thin film substrate 6 carrying integrated circuits 8 for control of the print head and carrying a central longitudinal array of light emitting diodes 12. The diode array is formed as a row of LED chips positioned one adjacent to the other so as to provide a continuous array of light emitting diodes which provide the pixel elements for a complete line of an image to be printed by the printer. The LED chips forming the diode array 12 are shown in more detail in our co-pending application Ser. No. 251,498 filed 9-30-88. Mounted directly above the diode array is a lens system 18 which consists of a number of short lengths of graded index lenses. A number of silicon photodetectors are provided in a slot 20 parallel to the lens 18. Approximately 1 photodetector per inch of diode array length is provided. The chips carrying the light emitting diode arrays also contain reference diodes 22 not forming part of the printing mechanism and normally being switched off.

Figure 1:
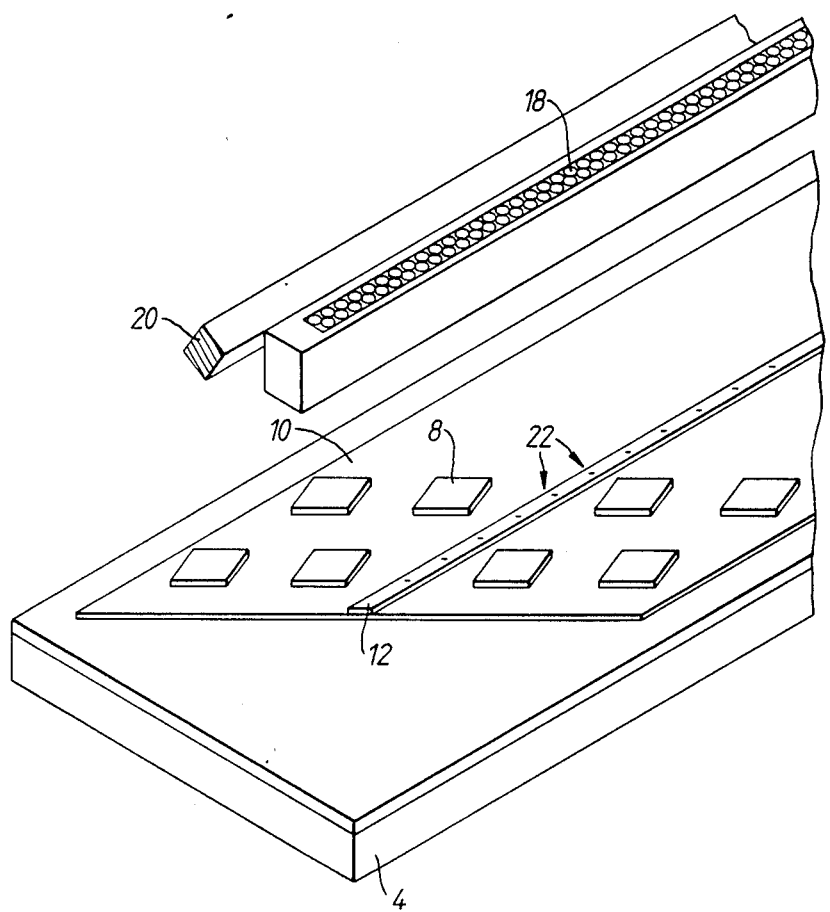
FIG. 1 is a perspective schematic view of a print head for a line printer incorporating the present invention.
Figure 2:
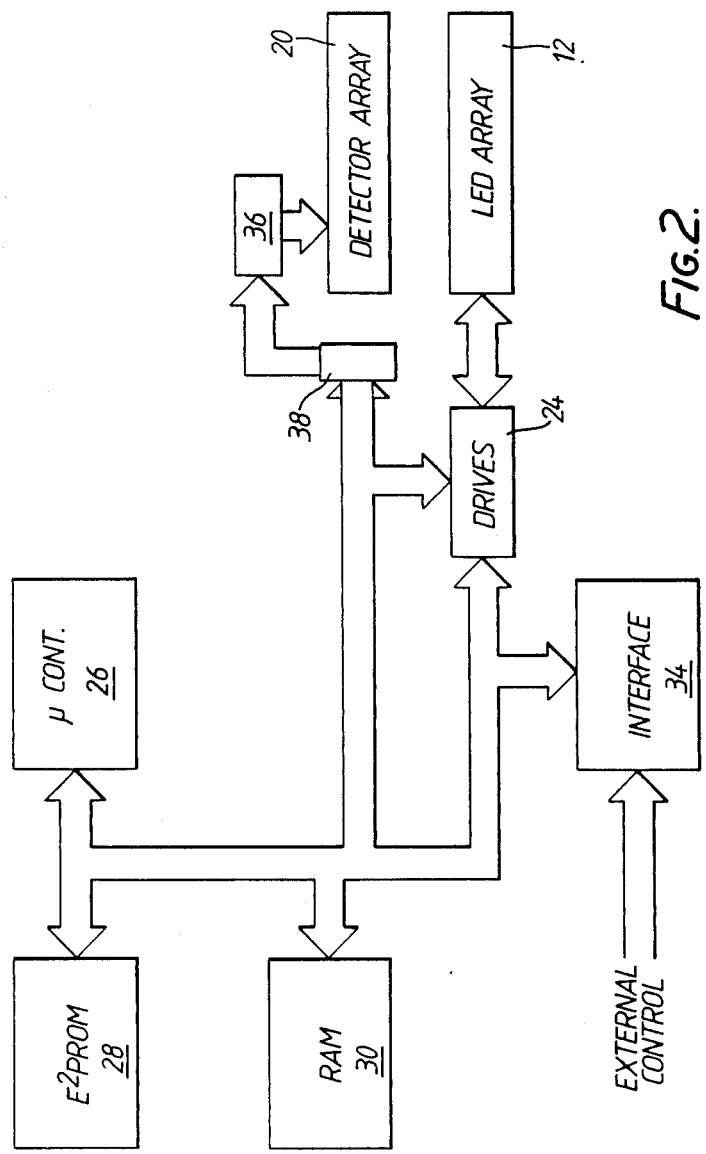
FIG. 2 is a block diagram of recalibration apparatus in accordance with the invention.

The control circuitry mounted on the central thin film substrate 6 is shown in FIG. 2. The light emitting diode array 12 is driven by a current driver system 24 which is in turn controlled by a microprocessor control 26. The current driver system 24 provides current pulses of modulated width in each duty cycle of operation to the light emitting diode array so as to provide the desired average current to each individual diode. Driver system 24 is coupled to receive data from a memory 28 which contains information relating to the desired current levels to be supplied to each individual diode array in terms of the time duration of the current pulses to be applied on each duty cycle. A memory 30 contains information relating to the desired illumination level provided by each diode and also corresponding data for the reference diodes. Memory 28 is an electrically erasable read only memory and memory 30 is a random access memory (RAM) The photodetector array 20 is coupled to a microprocessor control 26 in order to provide data to the control of actual illumination levels provided by the individual diodes of array 12. Microprocessor control 26 is operative to compare these actual illumination levels with the desired levels stored in memory 30. An external control communicating by an interface 34 is also provided for initiating and controlling a recalibration sequence. An amplifier system 36 is provided coupled between photodetector array 20 and analogue to digital converting arrangement 38 for transmitting digital data to the microprocessor control.

The data stored in memory 28 can be set at the manufacturing stage by consecutively illuminating the individual diodes at a fixed drive current and recording the actual illumination provided by a single external photodetector. These results are then compared with a reference level (which may be the lowest intensity output diode or an integral calibration diode) and all the diodes are then adjusted in drive current by means of the microprocessor control to give the same light output as the reference value by a reprogramming of memory 28 which stores the current values. Thus this gives a bar of uniform light intensity output along it's length. The LED are then individually illuminated and their light output as detected by photodetector array 20 is recorded and stored in memory 30.

Figure 3:
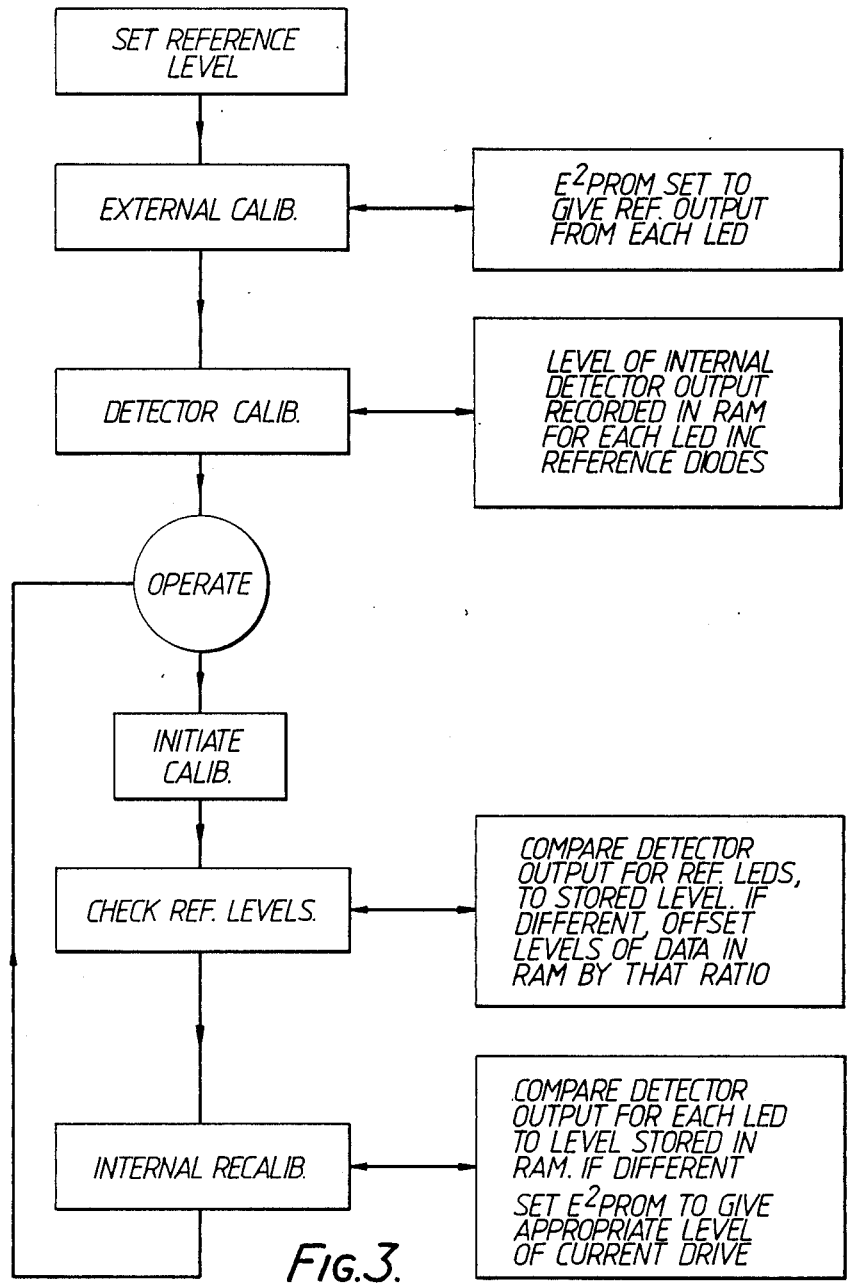
FIG. 3 is a flow diagram of the various recalibration steps employed in the method of recalibration according to the invention.

After a predetermined period of use and at appropriate intervals, say, in the initial warm up period (perhaps about 15 minutes long) at the beginning of a days work, a recalibration operation is carried out which is shown in FIG. 3. As an inital step the reference diodes in the LED array which are normally inoperative are switched on and the level of illumination provided by each reference diode is detected by the photodetectors and compared with the desired value stored in memory 30 If these values do not correspond, all the data stored in memory 30 is adjusted by the same ratio in order to take account of the changed conditions applying to the reference diodes, which may be caused by ambient conditions, or amplifier drift.

As a next step, each individual diode of the array is illuminated individually in a sequence of steps and for each diode the actual illumination detected is provided by a photodetector arrangement 20 and this actual illumination level is compared with the desired level stored in memory 30. If these two values do not correspond then the current level applied to the diode is adjusted by means of the microprocessor control adjusting the value in memory 28 and then when equality is reached between the desired and actual value of illumination, the adjusted current value for the light emitting diode is stored in memory. When the whole set of diodes has been calibrated, the calibration sequence is completed.

It will be understood that because the reference diodes are not normally in use, they will not degrade over a period of time. Normally two reference diodes are provided per chip. If all the reference diodes are employed in a recalibration operation, slight changes in one or two diodes will not have a significant effect.

We claim:

1. A method of automatic recalibration of a print head comprising an array of light emitting diodes (LED) each providing one pixel of an image to be printed, the method comprising:
    (a) providing one or more photodetectors for detecting the intensity of illumination of the diodes;
    (b) storing in memory data relating to individual current levels to be applied to the respective diodes for illumination thereof, and storing in memory data relating to individual intensities of illumination;
    (c) for each diode applying the respective current level and detecting the actual intensity of illumination with said one or more photodetectors, determining whether its actual intensity corresponds to the respective stored value of intensity of illumination, and if not adjusting the current level applied to the diode until the actual intensity corresponds with the respective stored value of intensity; and
    (d) replacing the data stored in memory with data relating to the adjust current level.

2. A method as claimed claim 1 wherein said method further comprises providing one or more reference light emitting diodes which are normally held in a switched off condition and storing in said memory data relating to individual current levels to be applied to the one or more reference diodes to achieve respective intensities of illumination and prior to the setp (c) of current level adjustment, applying the respective current level to a reference light emitting diode and determining by means of said photodetectors whether the actual intensity of illumination corresponds to the respective stored value of intensity of illumination, and if not adjusting the current level applied to the reference diode until the actual intensity corresponds to the stored value of intensity, replacing the data stored in memory with data relating to the adjusted current level to be applied to the reference diode, and replacing the data stored in memory relating to the desired level to be applied to the LED of the print array with similarly adjusted current levels.

3. A method as claimed in claim 1 wherein the current level data is stored in a reprogrammable read only memory and the data relating to individual intensities of illumination is stored in RAM.

4. A method as claimed in claim 1 wherein each diode in said array is recalibrated individually in a sequence of recalibration steps.

5. Apparatus for use in the method of recalibrating a print head as claimed in claim 1, the apparatus comprising an array of light emitting diodes (LED) each providing one pixel of an image to be printed, one or more photodetectors for detected the intensity of illumination of the diodes, a memory storing data relating to current levels to be applied to the diodes for illumination thereof, and means for storing data relating to individual intensities of illumination of the diodes, means for determining whether an actual intensity of illumination detected by said photodetectors corresponds with a stored value of intensity of illumination, means for adjusting the current levels to be applied to the diodes, and means for replacing the data stored in memory with data relating to adjusted current levels.

6. Apparatus as claimed in claim 5 including one or more reference light emitting diodes which are normally held in a switched off condition, and wherein said memory stores data relating to individual current levels for illuminating the reference diodes and individual levels of intensity of the reference diodes.

7. Apparatus as claimed in claim 6 wherein said light emitting diode array and said reference diodes are mounted on a plurality of LED chips.

8. Apparatus as claimed in claim 6 including a reprogrammable read only memory for storing said current level data, and a random access memory for holding said intensity data during a recalibration operation.

* * * * *